United States Patent
Yoshihara et al.

(10) Patent No.: US 7,161,652 B2
(45) Date of Patent: Jan. 9, 2007

(54) METHOD OF MANUFACTURING A LIQUID CRYSTAL DISPLAY DEVICE HAVING SPONTANEOUS POLARIZED LIQUID CRYSTAL, WITH HEATING AND APPLIED VOLTAGE

(75) Inventors: Toshiaki Yoshihara, Kawasaki (JP); Hironori Shiroto, Kawasaki (JP); Shinji Tadaki, Kawasaki (JP); Tetsuya Makino, Kawasaki (JP); Yoshinori Kiyota, Kawasaki (JP); Shigeo Kasahara, Kawasaki (JP); Keiichi Betsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 13 days.

(21) Appl. No.: 10/629,307

(22) Filed: Jul. 29, 2003

(65) Prior Publication Data

US 2004/0041975 A1 Mar. 4, 2004

(30) Foreign Application Priority Data

Aug. 30, 2002 (JP) ............................. 2002-255796
May 22, 2003 (JP) ............................. 2003-144867

(51) Int. Cl.
*G02F 1/13* (2006.01)
(52) U.S. Cl. .................. 349/188; 349/33; 349/172; 349/191
(58) Field of Classification Search .................. 349/33, 349/133, 134, 172, 184, 188, 191
See application file for complete search history.

(56) References Cited

U.S. PATENT DOCUMENTS 6,307,610 B1* 10/2001 Jones ........................ 349/133
6,310,677 B1* 10/2001 Togano et al. .............. 349/172
6,605,323 B1* 8/2003 Wingen et al. .............. 428/1.1

(Continued)

FOREIGN PATENT DOCUMENTS

CN 1315670 A 10/2001

(Continued)

OTHER PUBLICATIONS

Yoshihara et al.; "A Full-color FLC Display Based on Field Sequential Color with TFTs"; *Japan Society of Applied Physics Digest of Technical Papers*, Jul. 14-16, 1999; pp. 185-188.

(Continued)

*Primary Examiner*—Andrew Schechter
(74) *Attorney, Agent, or Firm*—Greer, Burns & Crain, Ltd

(57) ABSTRACT

The present invention provides a manufacturing method of a liquid crystal display device capable of achieving uniform alignment of monostable ferroelectric liquid crystal having spontaneous polarization, and provides the liquid crystal display device. The liquid crystal (monostable ferroelectric liquid crystal having spontaneous polarization) showing a phase sequence, either isotropic liquid phase-cholesteric phase-chiral smectic C phase, isotropic liquid phase-chiral nematic phase-chiral smectic C phase, or isotropic liquid phase-cholesteric phase-smectic A phase-chiral smectic C phase, from a high temperature side to a low temperature side, is sandwiched between two glass substrates having transparent electrodes and alignment films whose pretilt angle is not more than 2° and rubbing directions are parallel. In an alignment treatment which is performed to obtain a monostable state after heating the liquid crystal, an electric field with electric field strength of not less than 2 V/μm is applied in the vicinity of the transition temperature from a higher temperature phase than chiral smectic C phase to the chiral smectic C phase.

4 Claims, 8 Drawing Sheets
(2 of 8 Drawing Sheet(s) Filed in Color)

U.S. PATENT DOCUMENTS 6,614,491 B1 *   9/2003   Hasegawa et al. ............ 349/37
6,703,993 B1 *   3/2004   Miura et al. .................. 345/87

FOREIGN PATENT DOCUMENTS

JP            2002-517597 A      6/2002

OTHER PUBLICATIONS

Yoshihara et al.; "Invited Paper: A 254-ppi Full-color Video Rate TFT-LCD Based on Field Sequential Color and FLC Display"; *Society for Information Display Digest of Technical Papers*; May 2000; pp. 1176-1177.

* cited by examiner

150 μm

150 μm

150 μm

E=0

E>0

E<0

METHOD OF MANUFACTURING A LIQUID CRYSTAL DISPLAY DEVICE HAVING SPONTANEOUS POLARIZED LIQUID CRYSTAL, WITH HEATING AND APPLIED VOLTAGE

BACKGROUND OF THE INVENTION

The present invention relates to a manufacturing method of a liquid crystal display device and the liquid crystal display device, and more particularly relates to a manufacturing method of a liquid crystal display device using a liquid crystal having spontaneous polarization, and the liquid crystal display device.

DESCRIPTION OF THE RELATED ART

Along with the development of information-oriented society, small electronic apparatuses and mobile electronic apparatuses have been used. Accordingly, there is a demand for a small-size, light-weight, low-power consuming display unit for such electronic apparatuses, and then liquid crystal display devices that have superior characteristics compared to other display devices are in wide use.

The liquid crystal display devices are mainly classified into a transmission type and a reflection type. From the viewpoint of visibility, transmission type liquid crystal display devices using a back-light are more widely adopted, and color liquid crystal display devices using color filters are the mainstream.

As a color liquid crystal display device, a TN (Twisted Nematic) type using a switching element such as a TFT (Thin Film Transistor) is in wide use. Although a TFT-driven TN-type color liquid crystal display device has high display quality, the liquid crystal panel has a low transmittance of around 4%. In order to achieve high display screen brightness, a high brightness back-light is necessary, and therefore the consumption of power increases. Besides, since a color display is realized using color filters, a single pixel needs to be composed of three sub-pixels, and therefore a high-resolution display is difficult to be achieved and the displayed colors do not have sufficient purity. In order to solve these problems, a color liquid crystal display device based on a field-sequential color scheme was proposed.

Since a color liquid crystal display device based on the field-sequential color scheme does not require sub-pixels, a high-resolution display can be easily realized compared to color-filter type color liquid crystal display devices. Moreover, since this device does not use color filters, the color of light emitted by the light source can be used as it is for display, and the displayed colors have excellent purity. Furthermore, since the light utilization efficiency is high, this device has the characteristic of low power consumption. However, in order to realize a color liquid crystal display device based on the field-sequential color scheme, the liquid crystal must provide high-speed response.

In order to achieve a high-speed response of color liquid crystal display devices, the present inventor et al. are performing research on the methods for driving liquid crystals having spontaneous polarization by TFTs, etc. which may achieve 100 to 1000 times higher response speed compared to conventional methods. A liquid crystal having spontaneous polarization, particularly a ferroelectric liquid crystal, has a characteristic that the long-axis direction of the liquid crystal molecule is changed by the application of an electric field. Therefore, by sandwiching a liquid crystal panel using a ferroelectric liquid crystal between polarization plates whose polarization axes cross each other at right angles and using birefringence caused by the change in the long-axis direction of the liquid crystal molecules to change the intensity of transmitted light, it is possible to provide a display.

The driving of the liquid crystal by the TFTs can be achieved using either a bistable type or monostable type ferroelectric liquid crystal. In the monostable type in which the average molecular axis of a director of liquid crystal molecules (tilted direction of the liquid crystal molecules) of the liquid crystal is aligned in a single direction when no voltage is applied, it is particularly important to obtain a monostable state showing uniform alignment of the liquid crystal.

FIGS. 8A, 8B and 8C are concept views showing the tilted states of a monostable ferroelectric liquid crystal. FIG. 8A shows a state when an electric field E applied to the liquid crystal is equal to zero, i.e., when no voltage is applied; FIG. 8B shows a state when the electric field E applied to the liquid crystal is greater than zero, i.e., when a voltage of a first polarity is applied; and FIG. 8C shows a state when the electric field E applied to the liquid crystal is less than zero, i.e., when a voltage of a second polarity opposite to the voltage of the first polarity is applied. The arrow Rub indicates the rubbing direction of an alignment film (not shown), and an average molecular axis LCMA of a liquid crystal molecular director is aligned along the ridgeline of a cone C having a base in the Rub direction. In FIGS. 8B and 8C, examples of the direction of the electric field E are shown by arrows.

One end of the average molecular axis LCMA is positioned on the cone point Cp of the cone C, and the (other end of) average molecular axis LCMA rotates along the ridgeline of the cone C. In other words, when no voltage is applied, the liquid crystal shows a monostable state (first position) in which the average molecular axis LCMA is aligned in a single direction (for example, a direction defined by one point Ca on the outer circumference of the base of the cone C and the cone point Cp in FIG. 8A). When a voltage of the first polarity is applied, the liquid crystal shows a state in which the average molecular axis LCMA is tilted at an angle corresponding to the magnitude of the voltage of the first polarity from the position of the monostable state to one side (for example, a direction defined by one point Cb on the outer circumference of the base of the cone C and the cone point Cp in FIG. 8B: the second position). When a voltage of the second polarity opposite to the first polarity is applied, the liquid crystal shows either a state in which the average molecular axis LCMA maintains the first position or a state in which it is tilted from the position of the monostable state to the side opposite to the one side (for example, a direction defined by one point Cc on the outer circumference of the base of the cone C and the cone point Cp in FIG. 8C: the third position).

With a monostable ferroelectric liquid crystal, in general, by only introducing the liquid crystal into an empty liquid crystal panel, it is impossible to obtain uniform alignment of the liquid crystal in the chiral smectic C phase which is used in display. The reason for this is that, in the chiral smectic C phase, the average molecular axis LCMA can have two states of different directions. Therefore, in general, a DC voltage of electric field strength of about 1.5 V/μm or so is applied in a temperature range including the transition point from the cholesteric phase (or chiral nematic phase) to the chiral smectic C phase to align the direction of spontaneous polarization by the electric field and align the direction of the average molecular axis LCMA, and thereby realizing uniform alignment. The application of an electric field to the liquid crystal in a cooling process from a higher temperature phase than chiral smectic C phase to the chiral smectic C phase (in the vicinity of the transition temperature) to obtain a monostable state is called "alignment treatment".

As relevant prior art references, there are "AM-LCD", Yoshihara et al., '99 Digest of Technical Papers, p185 (1999); and "SID", Yoshihara et al., '00 Digest of Technical Papers, p1176 (2000).

SUMMARY OF THE INVENTION

The conventional alignment treatment suffers from a problem that, despite the application of a DC voltage, uniform alignment of liquid crystal can not be obtained and a high contrast ratio can not be achieved. It is considered that this problem is caused by other factors that dominate the alignment state of the liquid crystal.

The present invention has been made with the aim of solving the above problem, and it is an object of the present invention to provide a manufacturing method of a liquid crystal display device using a monostable liquid crystal having spontaneous polarization, particularly a ferroelectric liquid crystal, and the liquid crystal display device, which can realize uniform alignment of liquid crystal and a high contrast ratio by specifying correlations among the magnitude of a voltage (electric field) applied in an alignment treatment, the treatment temperature during the application of the voltage, the configuration of alignment films, and the phase sequence of the liquid crystal.

Another object of the present invention is to provide a manufacturing method of a liquid crystal display device using a monostable liquid crystal having spontaneous polarization, particularly a ferroelectric liquid crystal, in a liquid crystal display device utilizing an active matrix driving scheme wherein a switching element is provided for each pixel, which can realize uniform alignment of liquid crystal and a high contrast ratio by applying the same voltage to the pixels (preferably all the pixels).

A still another object of the present invention is to provide a liquid crystal display device capable of providing display of higher quality by driving a liquid crystal display device capable of realizing uniform alignment of liquid crystal and a high contrast ratio by a field-sequential color scheme.

A manufacturing method of a liquid crystal display device according to the present invention is a manufacturing method of a liquid crystal display device comprising two substrates sandwiching a liquid crystal having spontaneous polarization; and electrodes, formed on the substrates, for applying a voltage to the liquid crystal, wherein the liquid crystal shows a monostable state in which an average molecular axis of a director of liquid crystal molecules is aligned in a single direction when no voltage is applied, the method being characterized by applying an electric field with electric field strength of not less than 2 V/μm (preferably not less than 3 V/μm) in the vicinity of the transition temperature from a higher temperature phase than chiral smectic C phase to the chiral smectic C phase in an alignment treatment which is performed to obtain the monostable state after heating the liquid crystal.

According to the present invention, in a manufacturing method of a liquid crystal display device using a liquid crystal in which the average molecular axis of a director of liquid crystal molecules shows a monostable state when no voltage is applied, an electric field of electric field strength of not less than 2 V/μm is applied in the vicinity of the transition temperature to the chiral smectic C phase in an alignment treatment performed after heating the liquid crystal, so that it is possible to provide a manufacturing method of a liquid crystal display device capable of reducing alignment defects during the alignment treatment and realizing a uniform alignment state and a high contrast ratio.

The manufacturing method of a liquid crystal display device according to the present invention is characterized in that the temperature range of the vicinity of the transition temperature includes a temperature range of ±2° C. from the transition temperature. In the present invention, since the temperature range of the vicinity of the transition temperature to the chiral smectic C phase in the alignment treatment includes a temperature range of ±2° C. from the transition temperature, it is possible to provide a margin for temperature variations of the liquid crystal in the alignment treatment, thereby enabling more stable alignment treatment.

The manufacturing method of a liquid crystal display device according to the present invention is characterized in that the liquid crystal shows a phase sequence, either isotropic liquid phase-cholesteric phase (or chiral nematic phase)-chiral smectic C phase, or isotropic liquid phase-cholesteric phase-smectic A phase-chiral smectic C phase, from a high temperature side to a low temperature side. Since the present invention uses a liquid crystal having the phase sequence: isotropic liquid phase-cholesteric phase (or chiral nematic phase)-chiral smectic C phase, or isotropic liquid phase-cholesteric phase-smectic A phase-chiral smectic C phase, it is possible to easily realize a liquid crystal display device with a monostable ferroelectric liquid crystal.

A liquid crystal display device according to the present invention is a liquid crystal display device manufactured by the manufacturing method of the present invention, and characterized in that rubbing directions of the alignment films formed on the two substrates, respectively, are equal to each other. The liquid crystal display device of the present invention is characterized in that a pretilt angle of the alignment films is not more than 2°. According to the present invention, in the configuration of the alignment films, since the rubbing directions are made so-called parallel rubbing and the pretilt angle is set no more than 2°, it is possible to realize uniform alignment treatment with less alignment defects compared to anti-parallel rubbing and provide a liquid crystal display device having a high contrast ratio.

A liquid crystal display device according to the present invention is a liquid crystal display device manufactured by the manufacturing method of the present invention, and characterized by further comprising a back-light which is driven by a field-sequential color scheme, wherein a data-writing scanning voltage and a data-erasure scanning voltage are applied between the electrodes. Since the liquid crystal display device is driven by a field-sequential color scheme, it is possible to realize a liquid crystal display device capable of providing a color display with high-resolution, high-speed response and high color purity.

A manufacturing method of a liquid crystal display device according to the present invention is a manufacturing method of a liquid crystal display device comprising a pixel substrate having pixel electrodes; a common substrate with a common electrode placed to face the pixel substrate; data lines for supplying a pixel voltage to be applied to the pixel electrodes; switching elements for controlling connection and disconnection between the pixel electrodes and the data lines by ON and OFF; scanning lines for supplying a control voltage for controlling ON and OFF of the switching elements; and a liquid crystal with spontaneous polarization sandwiched between the pixel substrate and the common substrate, wherein the liquid crystal shows a monostable state in which an average molecular axis of a director of liquid crystal molecules is aligned in a single direction when no voltage is applied, the method being characterized by applying the control voltage for turning on the switching elements to the scanning lines and applying a DC voltage to the data lines in the vicinity of the transition temperature from a higher temperature phase than chiral smectic C phase to the chiral smectic C phase in an alignment treatment which is performed to obtain the monostable state after heating the liquid crystal.

In the present invention, since a control voltage for turning on the switching elements is applied to the scanning lines and a DC voltage is applied to the data lines, the DC voltage can also be applied as a pixel voltage to the pixels, and an alignment treatment of liquid crystal can be performed in a simple and uniform manner in a liquid crystal display device utilizing an active matrix driving scheme. In this case, if the DC voltage is applied to all the pixels, it is possible to perform further efficient and uniform alignment treatment.

The manufacturing method of a liquid crystal display device according to the present invention is characterized in that electric field strength applied to the liquid crystal by the pixel voltage is not less than 2 V/μm. In the present invention, since an electric field of electric field strength of not less than 2 V/μm is applied, it is possible to provide a manufacturing method of a liquid crystal display device capable of reducing alignment defects during an alignment treatment and having uniform alignment.

In the manufacturing method of a liquid crystal display device according to the present invention, since the control voltage for turning on the switching elements and the DC voltage applied to the pixels are at equal potential, it is possible to provide a manufacturing method of a liquid crystal display device capable of preventing deterioration in the characteristics of the switching elements during the alignment treatment and realizing stable alignment treatment and uniform alignment.

The above and further objects and features of the invention will more fully be apparent from the following detailed description with accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

Figure 1A:
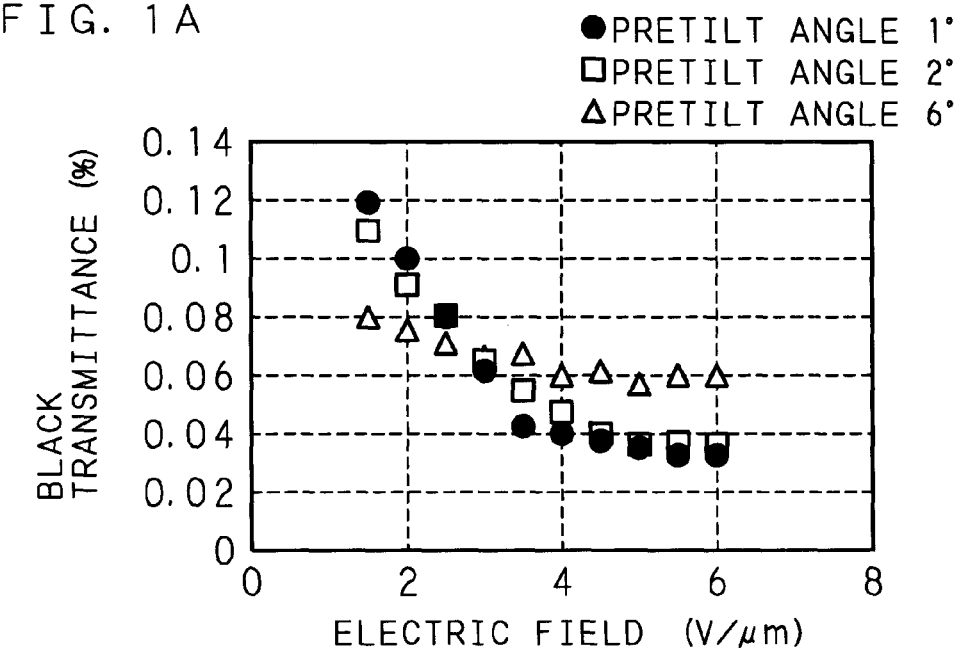
FIG. 1A is graph showing a correlation between the electric field in an alignment treatment and the black transmittance.

The following description will explain the present invention in detail, based on the drawings illustrating some embodiments thereof.

Embodiment 1

After washing a glass substrate having a transparent electrode with an electrode area of 1 $cm^2$ formed by ITO (Indium Tin Oxide), polyimide was applied to a glass substrate surface on which the transparent electrode was formed, and then baked under the conditions of 200° C. for one hour to form an about 20 nm polyimide film as an alignment film. As the types of alignment films, polyimide films having different pretilt angles of 1°, 2°, and 6° with respect to a nematic liquid crystal were used. Next, the surface of the polyimide film was rubbed with a rayon fabric, and then two glass substrates with the transparent electrodes were placed to face each other so that their rubbing directions were parallel (the rubbing directions were equal to each other: so-called parallel rubbing). A gap between the two glass substrates when placed to face each other was maintained by spacers made of silica having an average particle size of 1.8 μm, so that an empty cell for evaluation (evaluation empty cell) was produced. Note that the gap was about 2.0 μm or so in actual measurement.

An evaluation cell was produced by introducing into the evaluation empty cell a liquid crystal (a monostable ferroelectric liquid crystal having spontaneous polarization) showing the phase sequence: isotropic liquid (Iso) phase-cholesteric (Ch) phase (chiral nematic (N*) phase)-chiral smectic C (Sc*) phase from a high temperature side to a low temperature side. The transition temperature between the Iso phase and the N* phase was 108° C., the transition temperature between the N* phase and the Sc* phase was 68° C., and the magnitude of spontaneous polarization was 3.7 $nC/cm^2$. Note that the phase sequence of liquid crystal can be isotropic liquid (Iso) phase-cholesteric (Ch) phase-smectic A ($S_A$) phase-chiral smectic C (Sc*) phase.

In the Sc* phase, in order to obtain a uniform alignment state (monostable state), the evaluation cell was heated to a temperature of not less than 68° C. that is the transition temperature between the N* phase and the Sc* phase, a DC voltage was applied in a temperature range of 70 to 66° C. (68±2° C.) including 68° C. that is the transition temperature between the N* phase (higher temperature phase than chiral smectic C phase) and the Sc* phase (in the vicinity of the transition temperature from the higher temperature phase than chiral smectic C phase to the chiral smectic C phase) to perform an alignment treatment, and then the evaluation cell was cooled to room temperature (25° C.). The range of the DC voltage applied in the alignment treatment was between 3 V and 12 V. In this case, the electric field (electric field strength) was about 1.5 to 6 V/μm. Note that since the upper limit of the applied voltage is determined by the breakdown voltage of the liquid crystal, it is not necessary to increase the electric field to be equal to or larger than the breakdown voltage. In ordinary liquid crystals, a sufficiently uniform alignment state can be realized by an electric field of about 4 to 6 V/µm.

Figure 1B:
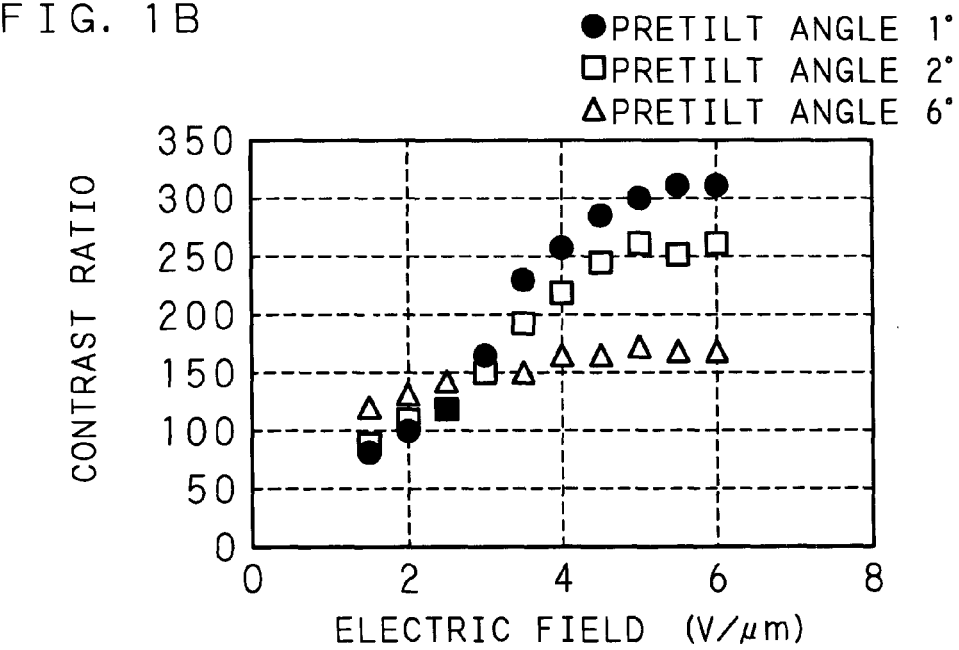
FIG. 1B is graph showing a correlation between the electric field in the alignment treatment and the contrast ratio.

FIG. 1A is graph showing a correlation between the electric field in the alignment treatment and the black transmittance. FIG. 1B is graph showing a correlation between the electric field in the alignment treatment and the contrast ratio. In FIG. 1A, the abscissa represents the electric field (V/µm) in the alignment treatment, and the ordinate represents the black transmittance (%). In FIG. 1B, the abscissa represents the electric field (V/µm) in the alignment treatment, and the ordinate represents the contrast ratio. In each case, the pretilt angles of 1°, 2°, and 6° were used as parameters. First, the evaluation cell to which the alignment treatment had been applied was sandwiched between two polarization plates arranged in a crossed-Nicol state, and the black transmittance (transmittance when 0 V was applied) and the white transmittance (transmittance when 10 V was applied) at 25° C. were measured. The black transmittance obtained in this measurement is shown in FIG. 1A, and the value obtained by dividing the white transmittance by the black transmittance (white transmittance/black transmittance) is shown as the contrast ratio in FIG. 1B.

In FIG. 1A, the black transmittance decreases with an increase in the electric field in the alignment treatment. This shows that the larger the electric field, the higher the uniformity of alignment. Moreover, it can be understood that the pretilt angles of 2° and 1° can realize a lower black transmittance compared to the pretilt angle of 6°. Since the black brightness becomes lower, the contrast ratio increases as described below.

In FIG. 1B, it can be understood that, in order to realize a contrast ratio of 100:1 which is considered a minimum contrast ratio required for a display device, an electric field of 2 V/µm (4 V voltage) or more is necessary in the alignment treatment. It can be understood that, in order to realize 150:1 or more which is a more desirable contrast ratio for a display device, an electric field of 3 V/µm (6 V voltage) or more is necessary in the alignment treatment. Further, in order to realize 200:1 which is a still more desirable contrast ratio for a display device, an electric field of 3.5 V/µm or more is necessary in the alignment treatment, and the pretilt angle needs to be 2° or less. It can also be understood that, with a pretilt angle of 1°, it is possible to achieve a high contrast ratio no lower than 300:1. Therefore, the pretilt angle is preferably not more than 2°, and more preferably not more than 1°. Note that the lower limit of the pretilt angle needs to be within a controllable range, and is, for example, 0.5°, or 0.3° or so.

Figure 2:
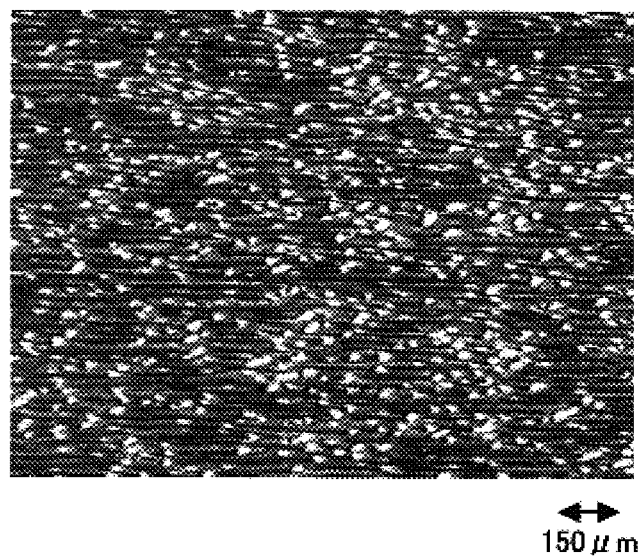
FIG. 2 is a photomicrograph showing the alignment state when a low electric field was applied in the alignment treatment.

FIG. 2 is a photomicrograph showing the alignment state when a low electric field was applied in the alignment treatment. The alignment state obtained when the pretilt angle was 1° and the electric field in the alignment treatment was decreased to 1.5 V/µm is shown in a black state. This was observed as a state obtained by sandwiching the evaluation cell between two polarization plates arranged in a crossed-Nicol state and aligning the transmittance axis of one of the polarization plates with the liquid crystal molecule long-axis direction of the liquid crystal. Black and white dots are present together, countless minute defects are seen, and a uniform black state is not obtained. In short, it can be understood that the alignment treatment was not sufficient due to the low applied voltage in the alignment treatment, and a uniform alignment state was not obtained.

Figure 3A:
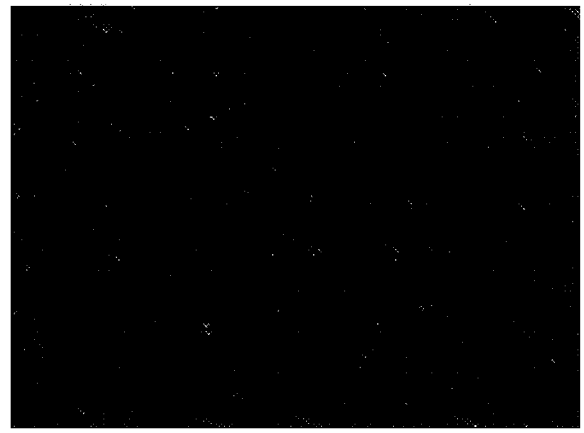
FIGS. 3A and 3B are photomicrographs showing the alignment state when a high electric field was applied in the alignment treatment.
Figure 3B:
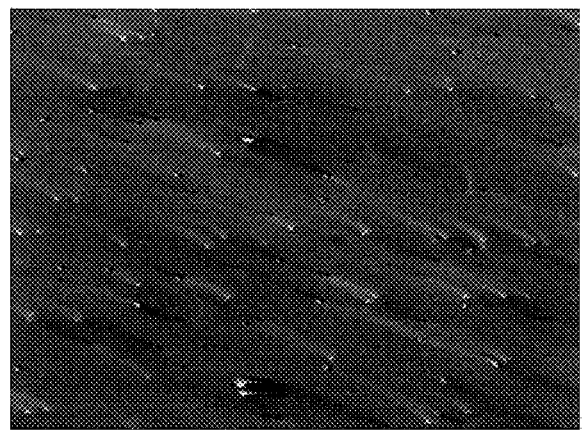

FIGS. 3A and 3B are photomicrographs showing the alignment states when a high electric field was applied in the alignment treatment. FIG. 3A shows the state obtained when the transmittance axis of one of the polarization plates was aligned with the liquid crystal molecule long-axis direction, while FIG. 3B shows the state obtained when the transmittance axis of one of the polarization plates and the liquid crystal molecule long-axis direction were not aligned with each other for reference. The alignment state obtained when the pretilt angle was 1° and the electric field in the alignment treatment was increased to 5 V/µm is shown in a black state. This was observed as a state obtained by sandwiching the evaluation cell between two polarization plates arranged in a crossed-Nicol state and aligning the transmittance axis of one of the polarization plates with the liquid crystal molecule long-axis direction of the liquid crystal. Unlike FIG. 2, the uniformity of the observed image is high and a substantially uniform black background state is shown, and thus it is apparent that the liquid crystal has a uniform alignment state, i.e., good alignment. Note that white minute dots slightly seen on the scattered dots were due to alignment defects caused by the spacers. On the other hand, FIG. 3B shows a state which was observed when the transmittance axis of one of the polarization plates and the liquid crystal molecule long-axis direction were not aligned so as to observe the alignment state in a bright state. Comet-like white portions were due to the spacers and a little clearer as an observed image compared to that of FIG. 3A because of non-alignment of the axis directions.

COMPARATIVE EXAMPLE OF EMBODIMENT 1

A comparative empty cell was produced in the same manner as the evaluation empty cell of Embodiment 1. The differences in the conditions were that only a pretilt angle of 1° was used, and the two glass substrates with the transparent electrodes were placed to face each other so that their rubbing directions were anti-parallel (the rubbing directions were oriented in mutually opposite directions: so-called anti-parallel rubbing). In the same manner as the evaluation cell of Embodiment 1, a comparative cell was produced by introducing into the comparative empty cell a liquid crystal showing the phase sequence: isotropic liquid (Iso) phase-chiral nematic (N*) phase-chiral smectic C (Sc*) phase from a high temperature side to a low temperature side.

Figure 4A:
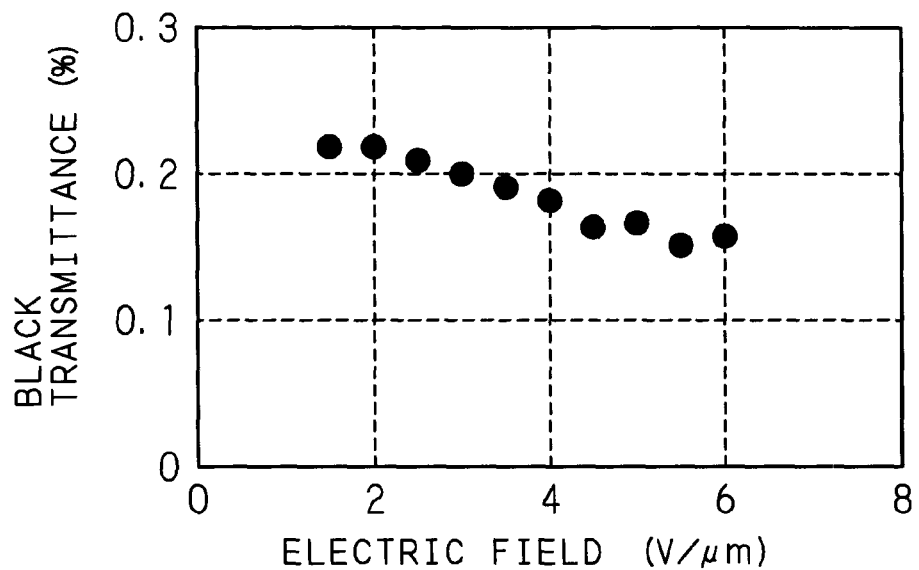
FIG. 4A is a graph showing a correlation between the applied voltage in the alignment treatment and the black transmittance in a comparative example of the Embodiment 1.
Figure 4B:
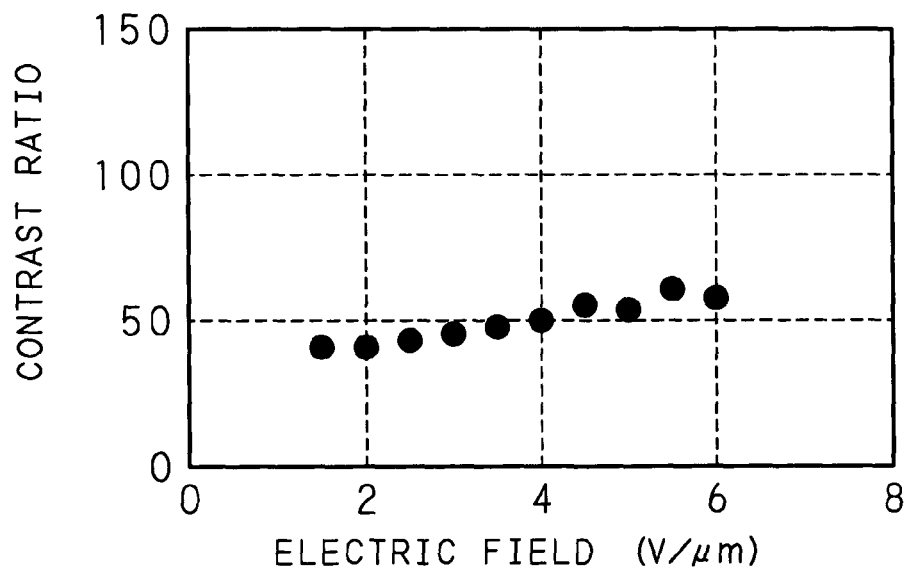
FIG. 4B is a graph showing a correlation between the applied voltage in the alignment treatment and the contrast ratio in the comparative example of Embodiment 1.

FIG. 4A is a graph showing a correlation between the applied voltage in the alignment treatment and the black transmittance in the comparative example of the Embodiment 1. FIG. 4B is a graph showing a correlation between the applied voltage in the alignment treatment and the contrast ratio in the comparative example of Embodiment 1. In FIG. 4A, the abscissa represents the electric field (V/µm) in the alignment treatment, and the ordinate represents the black transmittance (%). In FIG. 4B, the abscissa represents the electric field (V/µm) in the alignment treatment, and the ordinate represents the contrast ratio. First, the evaluation cell to which the alignment treatment had been applied was sandwiched between two polarization plates arranged in a crossed-Nicol state, and the black transmittance (transmittance when 0 V was applied) and the white transmittance (transmittance when 10 V was applied) at 25° C. were measured. The black transmittance obtained in this measurement is shown in FIG. 4A, and the value obtained by dividing the white transmittance by the black transmittance (white transmittance/black transmittance) is shown as the contrast ratio in FIG. 4B.

In FIGS. 4A and 4B, there is a tendency that the black transmittance decreases a little and the contrast ratio improves a little with an increase in the electric field in the alignment treatment. However, changes as remarkable as those in Embodiment 1 (FIGS. 1A and 1B) are not seen. Regarding concrete numeric values, the black transmittance was 0.04% for the electric field of 4 V/μm in Embodiment 1, while the black transmittance in the comparative example was high and a little less than 0.2%. The contrast ratio was 250 for the electric field of 4 V/μm in Embodiment 1, while it was as low as 50 or so in the comparative example. Such deterioration in the characteristics was due to anti-parallel rubbing directions which caused a decrease in the uniformity of the alignment state, alignment defects, and leakage of light from the defects. In short, the rubbing directions of the alignment films formed on the two substrates need to be equal to each other.

Embodiment 2

An empty panel with an electrode pattern different from that of Embodiment 1 was produced by the same method as in Embodiment 1. The basic specifications of the electrode pattern were 640×480 pixels and the electrode area of $6\times10^{-5}$ cm$^2$, and the size of the panel was 3.2 inches in diagonal. A TFT as a switching element was also formed for each pixel, and the pretilt angle was set only at 1°.

An evaluation panel (liquid crystal display device) was produced by introducing into the empty panel a liquid crystal showing the phase sequence: isotropic liquid (Iso) phase-cholesteric (Ch) phase-chiral smectic C (Sc*) phase from a high temperature side to a low temperature side. The transition temperature between the Iso phase and the Ch phase was 108° C., the transition temperature between the Ch phase and the Sc* phase was 68° C., and the magnitude of spontaneous polarization was 3.7 nC/cm$^2$.

In the cooling process in which the liquid crystal was cooled to room temperature (25° C.) by fixing the cooling rate at 1° C./minute after heating the liquid crystal to the Ch phase (80° C.), an alignment treatment was performed by applying a DC voltage of 10 V (electric field of 5 V/μm) in a temperature range of 73 to 63° C. (68±5° C.) including 68° C. that is the transition temperature between the Ch phase and the Sc* phase. The reason why the range of temperature in applying the alignment treatment was made wider than that of Embodiment 1 was to eliminate the influence of temperature variations because the area (panel size) of the evaluation panel is larger compared to the evaluation cell. The evaluation panel of Embodiment 2 realized a uniform alignment state exhibiting a contrast ratio of 300:1. The evaluation panel was sandwiched between two polarization films arranged in a crossed-Nicol state, and the average molecular axis LCMA in the absence of applied voltage was substantially aligned with the polarization axis of one of the polarization films to provide a dark state.

Figure 5:
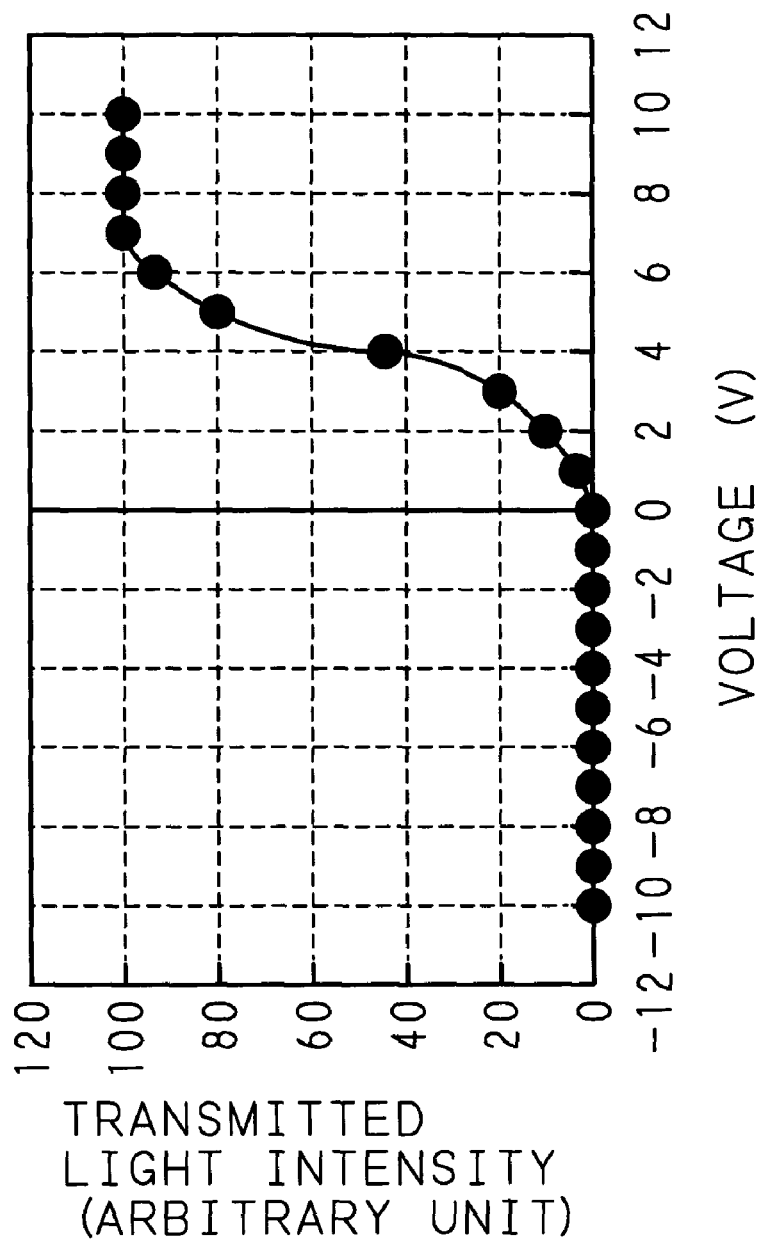
FIG. 5 is a graph showing the voltage-transmittance characteristic of a liquid crystal display device according to Embodiment 2.

FIG. 5 is a graph showing the voltage-transmittance characteristic of the liquid crystal display device according to Embodiment 2. The abscissa represents the voltage (V) applied through the TFT, while the ordinate represents a transmitted light intensity (in arbitrary unit) corresponding to a transmittance. Measurement was performed so that a high transmittance (transmitted light intensity) was obtained when a voltage of a first polarity (positive voltage) was applied. The transmitted light intensity indicated substantially zero with the application of a voltage of a second polarity (negative voltage), while the transmitted light intensity was 100 with the application of 10V voltage of the first polarity, so that the liquid crystal display device capable of providing a clear display was obtained.

Embodiment 3

The following description will explain the present invention applied to a liquid crystal display device utilizing an active matrix driving scheme (active matrix liquid crystal display device, hereinafter referred to as TFT-LCD). Since the basic structures of the TFT-LCD as a liquid crystal display device are the same as those in Embodiment 1 and Embodiment 2, the major features are mainly explained. Note that, as a liquid crystal (monostable ferroelectric liquid crystal having spontaneous polarization), it is possible to use a liquid crystal showing the phase sequence: isotropic liquid (Iso) phase-cholesteric (Ch) phase (chiral nematic (N*) phase)-chiral smectic C (Sc*) phase, or a liquid crystal showing the phase sequence: isotropic liquid (Iso) phase-cholesteric (Ch) phase-smectic A (SA) phase-chiral smectic C (Sc*) phase, from a high temperature side to a low temperature side.

Figure 6:
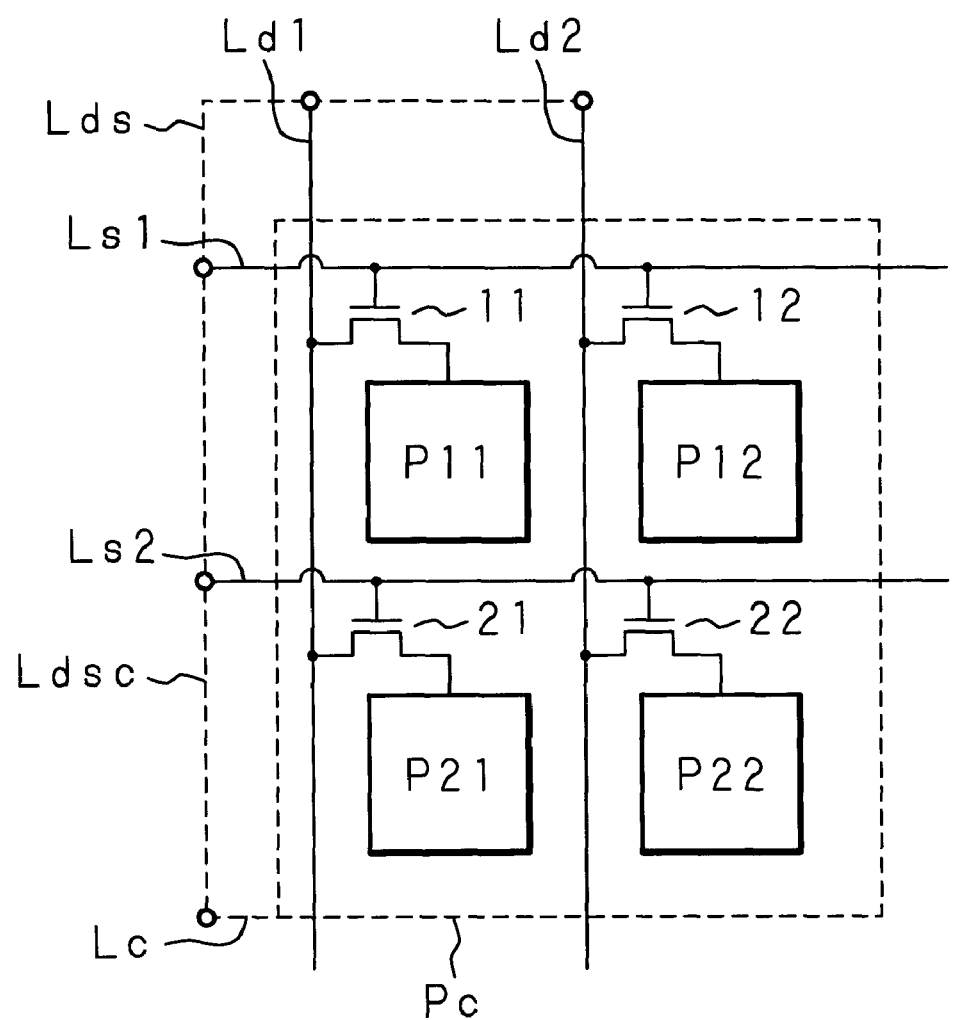
FIG. 6 is a structural view of a TFT-LCD, depicting the pixels arranged in a matrix form.

FIG. 6 is a structural view of a TFT-LCD, depicting the pixels arranged in a matrix form. The TFT-LCD of Embodiment 3 had 640×480 pixels, but 2×2 pixels arranged in a matrix form are depicted to facilitate understanding. Pixel electrodes P11, P12, P21 and P22 corresponding to the respective pixels are formed on a pixel substrate (not shown). Thin film transistors (hereinafter referred to as TFTs) 11, 12, 21 and 22 as switching elements are connected to the pixel electrodes P11, P12, P21 and P22, respectively. Since the pixel electrodes P11, P12, P21, P22 and the TFTs 11, 12, 21, 22 are formed on the pixel substrate, the pixel substrate is also called a TFT substrate. A common substrate (not shown) on which a common electrode Pc is formed is placed to face the pixel substrate. The pixel electrodes P11, P12, P21, P22 and the common electrode Pc are formed as transparent electrodes and arranged to face each other to apply a voltage (electric field) to the liquid crystal. The liquid crystal is sandwiched between the common substrate and the pixel substrate (between the common electrode Pc and the pixel electrodes P11, P12, P21 and P22).

Scanning lines (gate lines) Ls1 and Ls2 are formed in the row direction of the pixel substrate, and the scanning line Ls1 is connected to the gate electrodes of the TFTs 11 and 12, while the scanning line Ls2 is connected to the gate electrodes of the TFTs 21 and 22. The scanning line Ls1 supplies (applies) a control voltage for controlling ON and OFF (open and close) of the TFTs 11 and 12 to the gate electrodes of the TFTs 11 and 12, and the scanning line Ls2 supplies (applies) a control voltage for controlling ON and OFF (open and close) of the TFTs 21 and 22 to the gate electrodes of the TFTs 21 and 22. In short, ON and OFF of the TFTs 11 and 12 are controlled by the scanning line Ls1, and ON and OFF of the TFTs 21 and 22 are controlled by the scanning line Ls2.

Data lines (source lines) Ld1 and Ld2 are formed in the column direction of the pixel substrate, and the data line Ld1 is connected to the source electrodes of the TFTs 11 and 21, while the data line Ld2 is connected to the source electrodes of the TFTs 12 and 22. Therefore, the data line Ld1 can supply (apply) a pixel voltage to the pixel electrodes P11 and P21 through the TFTs 11 and 21, and the data line Ld2 can supply (apply) a pixel voltage to the pixel electrodes P12 and P22 through the TFTs 12 and 22. In short, connection and disconnection between the data lines (Ld1, Ld2) and the pixel electrodes (P11, P12, P21, P22) are controlled by ON and OFF of the TFTs (11, 12, 21, 22), so that a pixel voltage is applied from the data lines (Ld1, Ld2) to the pixel electrodes (P11, P12, P21, P22) during the connection.

The TFT-LCD had a pixel pitch of 0.1 mm×0.1 mm, 640×480 pixels, and a display area of 64 mm×48 mm (3.2 inches in diagonal). Polyimide was applied to the common substrate surface on which the common electrode (Pc) was formed and to the pixel substrate surface on which the pixel electrodes (P11, P12, P21, P22) were formed, and then baked at 200° C. for 1 hour to form about 20 nm polyimide films. A polyimide film having a pretilt angle of 1° with respect to a nematic liquid crystal was used as an alignment film. An empty panel was produced by rubbing the surfaces of the alignment films with a rayon fabric and then placing two substrates, namely the common substrate and pixel substrate, one upon another to face each other while keeping a gap between the two substrates with spacers made of silica having an average particle size of 1.8 µm. The gap of the produced empty panel was about 2.0 µm in actual measurement.

A liquid crystal panel was produced by introducing into the produced empty panel a liquid crystal (liquid crystal material) showing the phase sequence: isotropic liquid (Iso) phase-cholesteric (Ch) phase-chiral smectic C (Sc*) phase from a high temperature side. The phase transition temperature between the Iso phase and the Ch phase was 108° C., the phase transition temperature between the Ch phase and the Sc* phase was 68° C., and the magnitude of spontaneous polarization was 3.7 nC/cm$^2$. In the Sc* phase, in order to obtain a uniform alignment state (monostable state), after heating the liquid crystal panel into which the liquid crystal had been introduced to a temperature (for example, 80° C.) showing the Ch phase that is a higher temperature phase than the Sc* phase, it was cooled at a cooling rate of 1° C./minute.

EXAMPLE 1 OF EMBODIMENT 3

In Embodiment 3, in a temperature range in which the liquid crystal has a temperature between 73° and 63° (about 10 minutes at a cooling rate of 1°/minute, the vicinity of the transition temperature from a higher temperature phase than chiral smectic C phase to the chiral smectic C phase) in the cooling process, a DC voltage of 5 V was applied to all the scanning lines (supply of a control voltage), a DC voltage of 4 V was applied to all the data lines (supply of a pixel voltage), and a voltage of 0 V was applied to the common electrode (common electrode line). Note that a pixel substrate potential equalizing line (Lds) for connecting the scanning lines and the data lines and a potential equalizing line between substrates (Ldsc) for connecting the pixel substrate potential equalizing line (Lds) and a common electrode line (Lc) are disconnected beforehand. Since the application of voltage as an alignment treatment is performed before installing (connecting) a driver (liquid crystal drive circuit), it is not necessary at all to take into consideration the influence on the driver and the characteristics of the driver.

In this voltage application state, all the switching elements (TFTs) are in the ON state, and the pixel voltage (the voltage supplied to the pixels through the switching elements by the data lines) is applied to all the pixel electrodes. Moreover, an electric field of a magnitude determined by the pixel voltage and the gap between the substrates is applied to the liquid crystal sandwiched between the two substrates, namely the common substrate and the pixel substrate. Since the pixel voltage is 4 V and the voltage of the common electrode is 0 V, 4 V is applied to the sandwiched liquid crystal. Since the gap is 2 µm, the electric field strength applied to the liquid crystal is about 2 V/µm.

The TFT-LCD was sandwiched between two polarization plates arranged in a crossed-Nicol state, and the black transmittance (when 0 V was applied) and the white transmittance when 10 V was applied at 30° C. were measured. As a result, a uniform alignment state was obtained over the entire display area, but some irregular alignment was observed in the black display. However, it was possible to secure a black transmittance of 0.08%, a white transmittance of 8.80%, and a contrast ratio of 110. The contrast ratio of 110 is a sufficient value for practical use as a liquid crystal display device. In addition, it is possible to inspect the optical characteristics after the alignment treatment, and then attach polarization plates only to good products and install a driver, thereby enabling a reduction in the production cost.

The cause of the irregular alignment in Embodiment 1 can be considered as follows. The Vg-Id characteristic (horizontal gate voltage Vg versus vertical drain current Id characteristic) of the TFT after the alignment treatment is shifted to a high voltage side (the gate threshold voltage increases) compared to that before the alignment treatment, a voltage drop occurs in the TFT, and therefore the voltage applied across the liquid crystal (between the pixel electrode and the common electrode) decreases and a voltage sufficient for the alignment treatment is not applied to the liquid crystal. It can be considered that the shift of the Vg-Id characteristic of the TFT to the high voltage side is due to deterioration in the characteristic of the TFT caused by the temperature and the application of the DC voltage to the TFT in the alignment treatment.

In short, it can be considered that since the heating temperature in the alignment treatment is in the vicinity of the transition temperature from the Ch phase to the Sc* phase and higher than room temperature, and since a potential difference (1 V that is the difference between 5 V applied to the scanning line and 4 V applied to the data line) is given between the gate electrode (scanning line) and the source electrode (data line) at that high temperature for a long time, electrons are trapped in the gate insulation film of the TFT, and the shift of the gate threshold voltage occurs.

EXAMPLE 2 OF EMBODIMENT 3

In Embodiment 3, in a temperature range in which the liquid crystal has a temperature between 73° and 63° (about 10 minutes at a cooling rate of 1°/minute, the vicinity of the transition temperature from a higher temperature phase than chiral smectic C phase to the chiral smectic C phase) in the cooling process, a DC voltage of 4 V was simultaneously applied to all the scanning lines (supply of a control voltage) and all the data lines (supply of a pixel voltage), and a voltage of 0 V was applied to the common electrode (common electrode line). Since all the scanning lines and all the data lines are connected to each other by the pixel substrate potential equalizing line (Lds), it is possible to apply the pixel voltage of the same potential as the control voltage to the data lines. Further, by disconnecting the potential equalizing line between substrates (Ldsc) from the pixel substrate potential equalizing line (Lds) and the common electrode line (Lc), it is possible to apply 4 V to the pixel electrode side and 0 V to the common substrate side. Since the application of voltage as an alignment treatment is performed before installing (connecting) a driver (liquid crystal drive circuit), it is not necessary at all to take into consideration the influence on the driver and the characteristics of the driver.

In this voltage application state, all the switching elements (TFTs) are in the ON state, and the pixel voltage (the voltage supplied to the pixels through the switching elements by the data lines) is applied to all the pixel electrodes. Moreover, an electric field of a magnitude determined by the pixel voltage and the gap between the substrates is applied to the liquid crystal sandwiched between the two substrates, namely the common substrate and the pixel substrate. Since the pixel voltage is 4 V and the voltage of the common electrode is 0 V, 4 V is applied to the sandwiched liquid crystal. Since the gap is 2 μm, the electric field strength applied to the liquid crystal is about 2 V/μm.

The TFT-LCD was sandwiched between two polarization plates arranged in a crossed-Nicol state, and the black transmittance (when 0 V was applied) and the white transmittance when 10 V was applied at 30° C. were measured. As a result, a uniform alignment state was obtained over the entire display area, and a black transmittance of 0.06%, a white transmittance of 8.90%, and a contrast ratio of 148 were obtained. In particular, the contrast ratio was significantly improved compared to the contrast ratio of Embodiment 1. In addition, it is possible to inspect the optical characteristics after the alignment treatment, and then attach polarization plates only to good products and install a driver, thereby enabling a reduction in the production cost.

EXAMPLE 3 OF EMBODIMENT 3

In contrast to Example 2, the voltage application conditions in the vicinity of the transition temperature were changed such that all the scanning lines and all the data lines were made 0 V simultaneously, and a voltage of 4 V was applied as a DC voltage to the common electrode (common electrode line). In other words, in Example 3, the potential of the control voltage and pixel voltage was zero and lower than that of the common electrode. Note that other conditions were the same as in Example 2. The characteristics were measured under the same conditions as in Example 2. As a result, a uniform alignment state was obtained over the entire display area, and a black transmittance of 0.05%, a white transmittance of 8.80%, and a contrast ratio of 176 were obtained. A further higher contrast ratio was obtained compared to Example 2.

In Example 3, since the potential of the control voltage and pixel voltage (DC voltage) was made lower than that of the common electrode, the potential of the control voltage and pixel voltage was lower than that of the common electrode, thereby enabling stable alignment treatment. Moreover, by making the potential of the control voltage and pixel voltage (DC voltage) zero, further stable alignment treatment can be performed.

Embodiment 4

Figure 7:
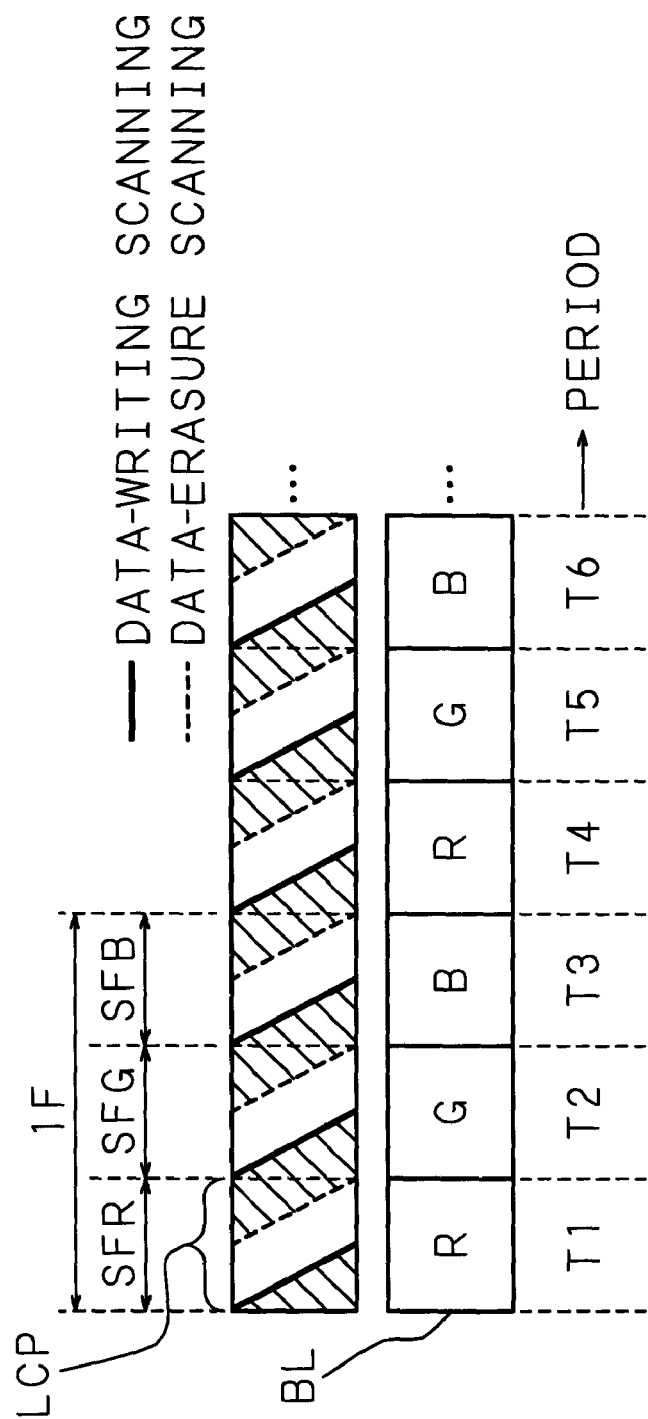
FIG. 7 is a concept view showing a drive sequence of a liquid crystal display device utilizing a field-sequential color scheme.
Figure 8A:
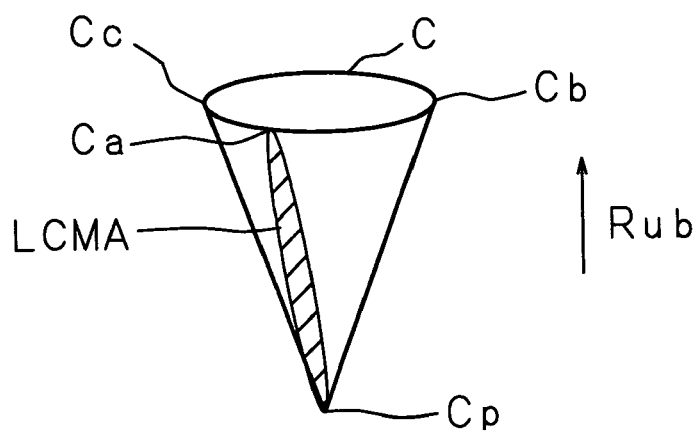
FIGS. 8A, 8B and 8C are concept views showing a tilted state of a monostable ferroelectric liquid crystal.
Figure 8B:
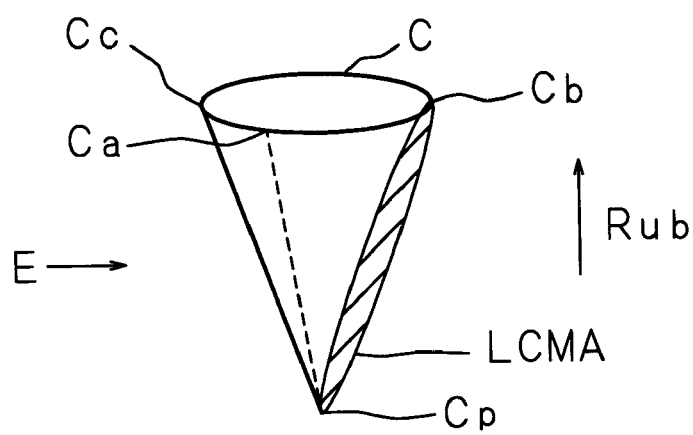
Figure 8C:
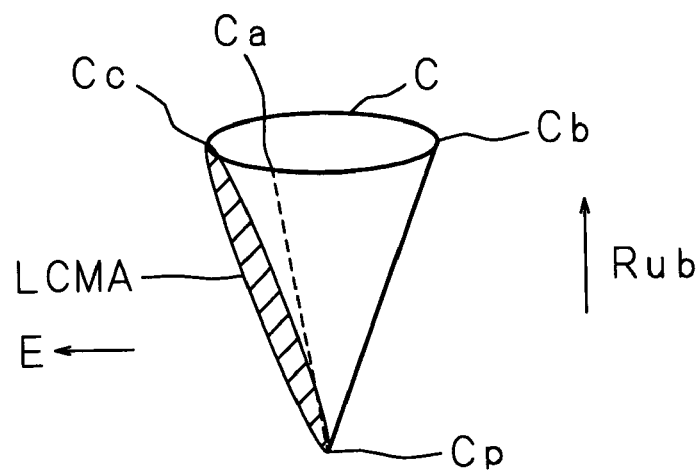

FIG. 7 is a concept view showing a drive sequence of a liquid crystal display device utilizing a field-sequential color scheme. A liquid crystal display device capable of being driven by the field-sequential color scheme was produced by combining a back-light BL capable of emitting light of red (R), green (G) and blue (B) in a time divided manner with a liquid crystal display panel LCP. The liquid crystal display panel LCP is the same as the evaluation panel of Embodiment 2.

The back-light BL driven by the field-sequential color scheme turns on R (red), G (green) and B (blue) in a time divided manner in periods T1, T2, and T3, respectively. Sub-fields SFR, SFG and SFB are formed to correspond to the periods T1, T2, and T3. By displaying a red screen, a green screen, and a blue screen in the sub-fields SFR, SFG, and SFB, respectively, and displaying a composite screen obtained by combining the screens of the respective colors in one field 1F (recognized as a composite screen obtained by the residual image effect of the vision of a human being), it is possible to provide a color display. The operation is repeated in and after periods T4, T5, and T6 in the same manner, thereby providing a color display. Note that each of the periods T1, T2 and T3 is about $1/180$ second or less, and one field 1F is about $1/60$ minute or less.

The applied voltage to the liquid crystal display panel LCP (between the electrodes, i.e., between the common electrode and the pixel electrode) was set within a range of ±7 V from 0, and then data-writing scanning was performed with a positive polarity voltage and data-erasure scanning (erasure: black writing) was performed with a voltage having negative polarity and substantially equal magnitude as that used in the data-writing scanning. With a liquid crystal display device designed to apply a drive voltage by the field-sequential color scheme, it was possible to realize a liquid crystal display device having high quality such as a high contrast ratio, high brightness and high color purity display. As the light source of the back-light BL, red, green and blue semiconductor light emitting diodes that allow easy adjustment of brightness and switching were used. Needless to say, the present invention is also applicable to color liquid crystal display devices using micro-color filters instead of the field-sequential color scheme.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A manufacturing method of a liquid crystal display device comprising a pixel substrate having pixel electrodes; a common substrate with a common electrode placed to face said pixel substrate; data lines for supplying a pixel voltage to be applied to said pixel electrodes; switching elements for controlling connection and disconnection between said pixel electrodes and said data lines by ON and OFF; scanning lines for supplying a control voltage for controlling ON and OFF of said switching elements; and a liquid crystal with spontaneous polarization sandwiched between said pixel substrate and said common substrate, wherein said liquid crystal shows a monostable state in which an average molecular axis of a director of liquid crystal molecules is aligned in a single direction when no voltage is applied, said method comprising the steps of:

heating the liquid crystal; and applying the control voltage for controlling the state of said switching elements to said scanning lines and applying a different DC voltage to said data lines and said common electrode in a vicinity of a transition temperature from a higher temperature phase than chiral smectic C phase to the chiral smectic C phase in an alignment treatment which is performed to obtain the monostable state after heating;

wherein said control voltage for controlling the state of said switching elements and the DC voltage applied to said data bus lines are at equal potential.

2. The manufacturing method of a liquid crystal display device of claim 1,
wherein the potential of said control voltage for controlling the state of said switching elements and the DC voltage applied to said data bus lines is lower than a potential of said common electrode.

3. The manufacturing method of a liquid crystal display device of claim 1,
wherein the control voltage and the DC voltage are zero.

4. A manufacturing method of a liquid crystal display device comprising a pixel substrate having pixel electrodes; a common substrate with a common electrode placed to face said pixel substrate; data lines for supplying a pixel voltage to be applied to said pixel electrodes; switching elements for controlling connection and disconnection between said pixel electrodes and said data lines by ON and OFF; scanning lines for supplying a control voltage for controlling ON and OFF of said switching elements; and a liquid crystal with spontaneous polarization sandwiched between said pixel substrate and said common substrate, wherein said liquid crystal shows a monostable state in which an average molecular axis of a director of liquid crystal molecules is aligned in a single direction when no voltage is applied, said method comprising the steps of:

heating the liquid crystal; and
applying the control voltage for controlling the state of said switching elements to said scanning lines and applying a different DC voltage to said data lines and said common electrode in a vicinity of a transition temperature from a higher temperature phase than chiral smectic C phase to the chiral smectic C phase in an alignment treatment which is performed to obtain the monostable state after heating;
wherein electric field strength to be applied to the liquid crystal by the voltage difference between said data lines and said common electrode is more than 5 V/µm, and
wherein said control voltage for controlling the state of said switching elements and the DC voltage applied to said data bus lines are at equal potential.

* * * * *